United States Patent Office 2,971,092
Patented Feb. 7, 1961

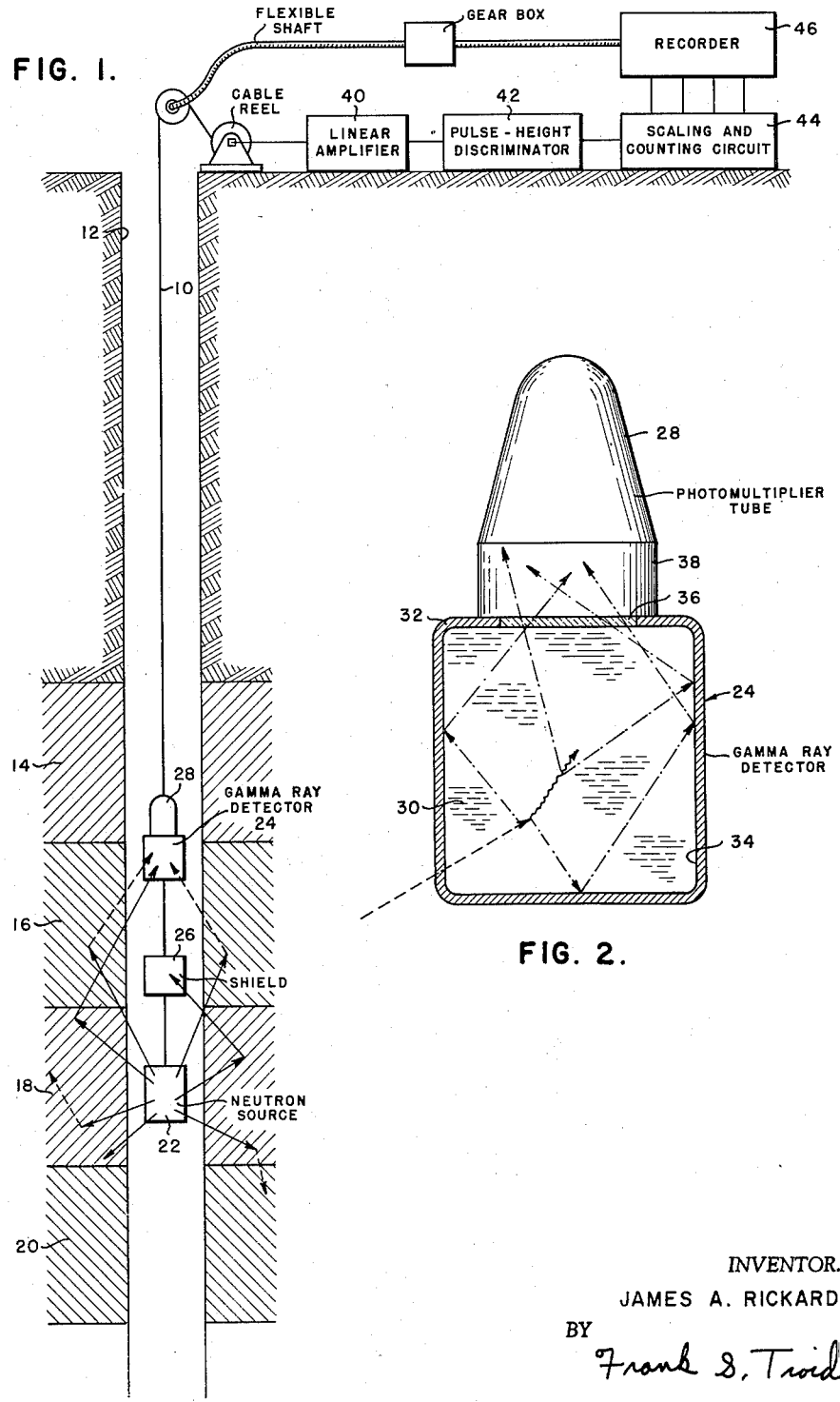

2,971,092

RADIATION WELL LOGGING

James A. Rickard, Houston, Tex., assignor, by mesne assignments, to Jersey Production Research Company, Tulsa, Okla., a corporation of Delaware Filed Nov. 21, 1957, Ser. No. 697,988

4 Claims. (Cl. 250—71.5)

This invention relates to radioactive logging. More particularly, this invention relates to an improved method and system for measuring gamma rays produced by the interaction of neutrons on nuclei of the various elements contained in subsurface formations.

The art of making radiation well logs is divided into two main types. These types are (1) the measurement of natural radioactivity, and (2) the measurement of induced or artificial radioactivity. In general, in carrying out natural radioactivity logging, a natural radioactivity detector is lowered in the borehole. This detector detects the natural radioactivity of the various natural radioactive substances contained in the subsurface formations. Induced radioactivity logging is carried out by lowering a source of primary particles into the borehole. This source may be a material or an accelerator or other high energy machine for emitting primary particles, such as neutrons or gamma rays. The emitted primary particles impinge or collide with nuclei of the various subsurface elements. The collision results in the emission of secondary particles, such as gamma rays, from the nuclei of the elements. The energy of the secondary radiation is uniquely characteristic of the particular chemical element which was involved in the nuclear reaction. Therefore, the presence in the secondary radiation spectrum of discrete energies of secondary radiation is indicative of the presence of particular elements in the formation. It is therefore possible to log directly for various chemical elements in a formation.

The primary particle most often utilized in induced radioactivity is a neutron. The neutron is used because, having no charge, it does not interact with the orbital electrons of an atom of the formation, but instead, can react only with the relatively small dense nucleus of the atoms. It is thus characteristic of the neutron which enables it to penetrate deep into the formation. The secondary particles emitted as a result of the bombardment of the atoms by the neutrons of which we are particularly interested in are the gamma rays. This type of induced radioactivity logging is often called neutron-gamma ray logging.

The best neutron-gamma ray logging method and system would be highly sensitive to gamma rays but completely insensitive to primary and secondary particles other than gamma rays. Unfortunately, prior to my invention such a system and method had not been devised. This is due to the harmful effects of neutron interference with the gamma ray spectrum.

The actual mechanism of this harmful interference effect takes place in the following manner: Neutrons enter the formation and most of them produce nuclear reactions in the formation. Some, however, are reflected from the formation and actually enter the gamma ray detector. In the gamma ray detector they may collide with a proton or other heavy nuclear entity such as, for example, a nucleus. In ordinary detection instruments the pulse resulting from the proton is indistinguishable from the pulse produced by a gamma ray. The net effect is that the reflected neutrons produce an unwanted and undesirable background to the gamma ray flux which is being measured. The actual amount of interference produced depends on a number of variables, such as the type and strength of the neutron source, the nature of the reflecting formations, the amount and geometry of the shielding employed, and the sensitivity of the detector for neutrons. Under optimum conditions, however, the neutron flux may be of the order of 20 percent of the total counting rate observed and under average conditions this neutron flux may be much greater.

Every effort to avoid this harmful neutron interference has been made. Many types of scintillating materials have been devised which are fairly sensitive to gamma rays and less sensitive to neutrons. Well logging scintillators have also been devised. In spite of all efforts, however, the perfect instrument, one that is 100% efficient for gamma rays and 0% efficient for neutrons, has not yet been devised.

Accordingly, one of the objects of the present invention is to provide a method and system for reducing the unwanted neutron interference to gamma ray counting to a minimum.

A further object of this invention is to provide a method and apparatus which can easily be adapted to borehole use for surveying and logging formations.

Briefly described, the method consists of penetrating the subsurface formations with neutrons. The gamma rays resulting from the collision of the neutrons with the nuclei of the elements in the formation are detected by a specially constructed detector. The detector includes a material which will spontaneously generate light due to electrons travelling at a speed greater than the speed of light in the material when the electrons are impinged by the incident gamma rays. The unwanted neutrons, because of the nature of the material in the detector, will not cause any secondary particles to move through the material at a speed greater than the speed of light in the material. Hence, any particles caused to move through the material due to neutron bombardment of the material will not spontaneously generate light. As a result, the system is sensitive only to gamma rays and completely insensitive to other rays or other particles. The spontaneously generated light is detected and pulses produced having a magnitude proportional to the energy of the gamma rays causing the movement of the electrons. The pulses are then recorded. The energy levels of the recorded pulses are indicative of the type of elements in the formation giving rise to the gamma rays.

The invention, as well as its many advantages, will be further understood by reference to the following detailed description and drawings, in which:

Fig. 1 is a schematic view showing the system in operation for carrying out neutron-gamma ray well logging; and Fig. 2 is an elevational view, partly in section showing the detector used in the system.

Referring to Fig. 1, a cable 10 is shown lowered into a borehole 12 which traverses a plurality of subsurface formations 14, 16, 18, and 20. A neutron source 22 and a gamma ray detector 24 separated by a shield 26 are mounted in spaced relation on the movable conducting cable 10. A photomultiplier tube 28 is mounted in juxtaposition with the detector 24.

The neutron source 22 emits neutrons which follow random paths into the subsurface formations as indicated by the solid arrows. Some of the neutrons undergo nuclear reactions producing gamma rays as indicated by the dashed arrows.

Some of the gamma rays produced by the nuclear reaction resulting from the bombardment of the atoms in the subsurface formations by the neutrons are detected by detector 24 and a signal fed to the surface and recorded. Some of the neutrons from the neutron source 22 are reflected from the formation into the detector where they normally produce an unwanted background. However, the detector 24 is substantially insensitive to neutrons, and hence the signals conducted through cable 10 to be recorded at the surface are representative only of the energies of the detected gamma rays.

The structure of the detector 24, shown in more detail in Fig. 2, makes use of the physical law that an intolerable physical situation exists if a particle is moving through a medium faster than the speed of light in said medium. If the particle moving through the medium faster than the speed of light in the medium is a charged particle and the medium is transparent, the charged particle spontaneously radiates energy in the form of light as it travels.

The detector 24 is filled with a radiating material 30 having a refractive index such that electrons struck by the gamma rays entering the radiating material will travel through the radiating material faster than the speed of light through said material. This motion of the electrons causes light to be spontaneously radiated by the moving electrons. The material whose index of refraction may range from 1.001 to 10.0 or higher is enclosed by a light-tight enclosure 32 which may be silvered on the inside 34 to reflect any light which may fall upon it. A light-transparent window 36 is included to convey light from the material to the photomultiplier tube 28. Light pipes 38 may be used to help convey this light to the photomultiplier tube.

A large number of materials are suitable. Included among them are water, carbon tetrachloride, lead glass, $C_2Cl_4$, $CHBr_3$, $C_6H_4Br_2$, $Pb(CH_3)_4$, $Pb(ClO_3)_4$, $Pb(C_2H_5)_4$, and $CH_3CHBr_2$.

As formerly stated, the gamma rays entering detector 24 may react with orbital electrons of the atoms of the radiating material. A large part of the energy of the gamma rays is transferred to the electrons which move with great speed through the material. The unwanted neutrons, however, do not react with orbital electrons of the atoms. They react only with the nucleus or with protons. Both the electrons produced by the gamma rays and the protons produced by the neutrons being charged particles, can spontaneously radiate light if travelling through the medium at a speed faster than light. However, since the proton is much more massive than the electron, the required energy to move the proton through the medium faster than light is much higher than the required energy to move the electron through the medium faster than light. The energy of most gamma rays produced in neutron-gamma ray logging is sufficiently high to cause the electrons resulting from the impingment of the gamma rays with the atoms of the radiating material to travel faster than the speed of light in the radiating material, thus spontaneously radiating light. However, the energy of the unwanted reflected neutrons is not great enough to cause the protons resulting from the bombardment of the nucleus of the atoms by the neutrons to travel faster than light. Thus, the light detected by the photomultiplier tube 28 is due entirely to the gamme rays. The detector, therefore, is insensitive to neutrons.

For example, if the radiating material used is carbon tetrachloride ($CCl_4$) having a refractive index of 1.46, the speed of light through the radiating material is about two-thirds the speed of light in air. The speed of the gamma rays and neutrons is unchanged as they enter from one medium to another. If carbon tetrachloride is used, an electron having 174 kev. energy is travelling exactly as fast as light is travelling in that medium. Therefore, any electron of energy greater than 174 kev. will emit spontaneous radiation. Most of the gamma rays detected in neutron-gamma ray well logging have sufficient energy to impart at least 174 kev. energy to the electrons produced by the impingment of the gamma rays upon the orbital electrons of the atoms in the radiating material. A proton, however, being much more massive than an electron, would have to have 350 mev. energy in order to travel as fast as light in carbon tetrachloride. The unwanted reflected neutrons normally encountered in neutron-gamma ray logging do not have sufficient energy to cause the protons resulting from the bombardment of the nuclei of the atoms in the fluid material to travel faster than light in the medium.

Thus, again referring to Fig. 2, the impinging gamma ray indicated by the dashed arrow generates an electron indicated by the wavy arrow which spontaneously radiates light indicated by the dashed dot arrows as the electron travels through the medium faster than the speed of light through the medium. The amount of radiation emitted is proportional to the energy of the electron. The radiation is fed to the photomultiplier tube which produces electric signals proportional to the radiation. These signals are conducted through the conducting cable to surface equipment, such as shown in Fig. 1.

The pulses from the photomultiplier 28 are fed through conducting cable 10 to a linear amplifier 40 and a pulse-height discriminator 42. The pulse-height discriminator 42 separates the pulses according to discreet energy levels. The output from pulse-height discriminator 42 is fed to a scaling and counting circuit 44 and from the scaling and counting circuit 44 to a recording circuit 46. The records obtained by the recording circuit 46 may be plotted as a gamma ray spectrum from which the various elements and isotopes giving rise to the gamma rays can be ascertained, and their relative amounts within the subsurface formation determined.

It is to be understood that various modifications may be made without departing from the scope of this invention.

I claim:

1. A radiation well logging system comprising: a primary radiation source for emitting primary radiations and a secondary radiation detector mounted on a movable conducting cable, said detector including a radiating material having a refractive index such that electrons struck by the secondary radiation entering the radiating material will travel through the radiating material faster than the speed of light through said radiating material thereby causing light to be spontaneously radiated by the moving electrons; said material also being such that particles in the material struck by the primary radiations will not travel through the radiating material faster than the speed of light; means for detecting the spontaneously radiated light and producing electric signals proportional thereto; and means for recording said electric signals.

2. An induced gamma ray well logging system comprising: a neutron source for emitting neutrons and a gamma ray detector mounted on a movable conducting cable, said gamma ray detector including a radiating material having a refractive index such that electrons struck by the gamma rays entering the radiating material will travel through the radiating material faster than the speed of light through said radiating material thereby causing light to be spontaneously radiated by the moving electrons said material also being such that particles in the material struck by the primary radiations will not travel through the radiating material faster than the speed of light; means for detecting the spontaneously radiated light and producing electric signals proportional thereto; and means for recording said electric signals.

3. An induced gamma ray well logging system in accordance with claim 2 wherein a light-tight enclosure contains the radiating material.

4. An induced gamma ray well logging system in accordance with claim 3 wherein the refractive index of the radiating material ranges from 1.001 to 10.0.

(References on following page)

References Cited in the file of this patent

UNITED STATES PATENTS 2,752,504 McKay _____ June 26, 1956
2,828,423 Scherbatskoy _____ Mar. 25, 1958

OTHER REFERENCES

A Lead Glass Cerenkov Radiation Photon Spectrometer by John W. Brabant et al., published by Radiation Laboratory, University of California, Berkeley, Calif. UCRL-3490, Aug. 7, 1956, 16 pages.